United States Patent
Szajnowski et al.

(10) Patent No.: US 7,352,321 B2
(45) Date of Patent: Apr. 1, 2008

(54) DETERMINING STATISTICAL DESCRIPTORS OF A SIGNAL FROM A SET OF ITS SAMPLES

(75) Inventors: Wieslaw Jerzy Szajnowski, Surrey (GB); Miroslaw Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 232 days.

(21) Appl. No.: 11/232,032

(22) Filed: Sep. 22, 2005

(65) Prior Publication Data

US 2006/0072816 A1   Apr. 6, 2006

(30) Foreign Application Priority Data

Sep. 23, 2004   (EP) .................................. 04255797

(51) Int. Cl.
 *G01S 13/00* (2006.01)
(52) U.S. Cl. .................... 342/90; 342/192; 342/195
(58) Field of Classification Search ................ 342/90, 342/192, 195, 196
See application file for complete search history.

(56) References Cited

U.S. PATENT DOCUMENTS

| | | | | |
|---|---|---|---|---|
| 4,268,828 A | * | 5/1981 | Cribbs et al. | 342/26 D |
| 4,707,697 A | | 11/1987 | Coulter et al. | |
| 4,972,193 A | * | 11/1990 | Rice | 342/90 |
| 5,068,664 A | * | 11/1991 | Appriou et al. | 342/90 |
| 5,392,050 A | * | 2/1995 | Guerci et al. | 342/90 |
| 5,867,118 A | * | 2/1999 | McCoy et al. | 342/90 |
| 6,580,388 B1 | * | 6/2003 | Stoyanov et al. | 342/192 |
| 6,751,354 B2 | * | 6/2004 | Foote et al. | 382/224 |

OTHER PUBLICATIONS

"Signal detection in partially known cyclostationary non-Gaussian noise", Izzo, L.; Paura, L.; Tanda, M.Aerospace and Electronics Conference, 1990,Proceedings of the IEEE National May 21-25, 1990 pp. 116-119 vol. 1.*

* cited by examiner

*Primary Examiner*—John B Sotomayor
(74) *Attorney, Agent, or Firm*—Birch, Stewart, Kolasch & Birch, LLP

(57) ABSTRACT

An entity is subjected to an interrogating signal, and the reflection from the entity is repeatedly sampled to obtain a first set of values each dependent on the intensity of the reflected signal. A logarithmic transformation is applied to the sample values to obtain a second set of values. A set of descriptor values is derived, the set comprising at least a first descriptor value (L) representing the difference between the mean and the median of the second set of values, and a second descriptor value (D) representing the mean of the absolute value of the deviation between each second set value and an average of the second set of values.

20 Claims, 4 Drawing Sheets

DETERMINING STATISTICAL DESCRIPTORS OF A SIGNAL FROM A SET OF ITS SAMPLES

BACKGROUND OF THE INVENTION

1. Field of the Invention

This invention relates to a method and apparatus for determining statistical parameters of a signal from a finite set of its samples, and is particularly but not exclusively applicable to characterizing and classifying physical entities, including complex man-made objects such as ground vehicles, by utilizing information contained in the fluctuating power of electromagnetic waves backscattered by such entities. The following description will mainly refer to classification of objects, but is predominantly applicable also to classification of other entities, such as sea clutter, sound waves, etc.

2. Description of the Prior Art

There are many circumstances in which an object, system or phenomenon under examination modifies some characteristics of a probing signal, be it electrical, acoustic, electromagnetic (which is intended herein to include both radio and optical signals) and the like. In one class of applications, only the intensity or power of the response to a probing signal can be determined. In general, at least some incomplete information related to the object's features and characteristics will be encapsulated in the observed response signal. Consequently, any inference on the object under examination must include a step of constructing a set of informative descriptors or parameters characterizing the response signal.

As will be described in more detail below, an example in which determining descriptors of a response signal is useful is that of ground-vehicle classification based on illuminating a vehicle of interest with pulses of electromagnetic wave energy and analysing the power of signals reflected by the vehicle. Such an all-weather classification technique can be utilized in various automated surveillance systems installed for monitoring purposes, e.g., to offer improved continuous surveillance of roads leading to bridges, tunnels and critical industrial infrastructure, including power plants, gas and oil storage systems, water storage and supply systems, etc.

A typical man-made object of interest, such as a ground vehicle, consists of a plurality of component scatterers of regular design, including flat plates, curved surfaces, corner reflectors, various cavities and the like. For a fixed frequency of the interrogating waveform and for a fixed aspect angle, the reflection from every individual scatterer can be regarded as a vector quantity, characterized by its specific magnitude and the phase angle. Consequently, the total signal backscattered by a complex man-made object results from the vector summation of the reflections contributed by every scatterer making up the object. Therefore, even very small changes in the aspect angle of a complex man-made object may produce large fluctuations in the backscattered signal.

Furthermore, if the separation between dominant component scatterers is comparable to a large number of wavelengths, then even a fractional change in carrier frequency of the interrogating waveform will drastically change the result of the vector summation, hence the value of reflected power.

In the case of ground-vehicle classification, it may be assumed that the power of backscattered signals is both frequency dependent and (aspect) angle dependent. August W. Rihaczek and Stephen J. Hershkowitz: "Theory and Practice of Radar Target Identification", Artech House. Boston 2000, contains a detailed analysis of various scattering phenomena observed experimentally when examining complex man-made objects.

FIG. 1 depicts a hypothetical experiment in which a vehicle VH is rotated on a turntable TT. A transmitter TX utilizes suitable pulses of electromagnetic wave energy to illuminate the vehicle via a transmit antenna TA. A composite signal backscattered from the vehicle VH is captured by a receive antenna RA connected to a stationary receiver RX which incorporates a suitable analyser AN to determine the instantaneous power of the signal. Because the aspect angle ξ of the vehicle VH with respect to the receiver RX is changing continually, the level of the signal backscattered from the vehicle will fluctuate in some irregular manner. Some selected examples of scatter data obtained from turntable experiments are presented in Peyton Z. Peebles Jr.: "Radar Principles". Wiley, New York 1998.

If the time intervals between the interrogating pulses are large enough, the corresponding pulses reflected from the vehicle will be uncorrelated. Additionally, irrespective of the intervals between the transmitted pulses, decorrelation of the reflected pulses can be achieved by exploiting the so-called frequency agility technique, i.e. by suitably shifting the value of transmitted carrier frequency from pulse to pulse. The use of uncorrelated responses is advantageous as it improves the efficiency of statistical inference procedures. The frequency-agility technique is well known to those skilled in the art.

Owing to the irregular nature of signals backscattered by complex man-made objects, the power of a signal reflected by a moving ground vehicle can be regarded as a random variable which may assume only positive values. In microwave remote sensing applications, fluctuating power reflected by complex objects is characterized by several well-known probability density functions (pdfs), including a gamma pdf of the form $$p(x; \sigma, \alpha) = \frac{\alpha}{\Gamma(\alpha)\sigma}\left(\frac{\alpha x}{\sigma}\right)^{\alpha-1} \exp\left(-\frac{\alpha x}{\sigma}\right)$$

where x is the random power, Γ( ) is the gamma function, α is the shape parameter, and σ is the scale parameter. For α=1 and α=2, the above pdf yields two popular Swerling models, known to those skilled in the art. In the case when α=1, a gamma distribution reduces to an exponential distribution. FIG. 2 shows the probability density functions representing the two Swerling models.

Other popular statistical models of backscattered power are based on a Weibull distribution and a log-normal distribution. Yet another model, exploiting a Rice distribution, is useful when an object of interest comprises one dominant reflector and a plurality of smaller scatterers.

There also exists a broad class of statistical models of backscattered power based on an exponential distribution $$p(x; \sigma) = \frac{1}{\sigma}\exp\left(-\frac{x}{\sigma}\right)$$

modified in such a way that the scale parameter σ itself is a random variable. When the scale parameter is distributed according to a gamma distribution, the resulting model has the so-called K distribution. A Suzuki model for reflected power is obtained from the primary exponential model, when the scale parameter itself is a log-normal random variable.

All the above and also other stochastic models of fluctuating power reflected by complex objects depend on two parameters: one related to the mean value of reflected power and one characterizing the shape of the underlying statistical distribution. The properties and the applicability of the above statistical models of reflected power, summarised in Peyton Z. Peebles Jr.: "Radar Principles". Wiley, New York 1998 and Fred E. Nathanson: "Radar Design Principles", 2nd Ed., McGraw-Hill, New York 1991, are well known to those skilled in the art.

The statistical models discussed above are very useful in theoretical studies, especially on object detection, because each underlying probability density function is given in an analytical (explicit or implicit) form. However, the applicability of those models to practical problems of object classification is limited for the following reasons:

In all the proposed statistical models, when a scale parameter is fixed, only a single parameter governs the distribution shape, which includes both the main 'body' of the distribution as well as its tail. When the number of samples obtained experimentally is small or moderate (say, less than one thousand), any statistical inference regarding the tail of the underlying distribution cannot be reliable. Therefore, the performance of classification procedures based on a single shape parameter will be unsatisfactory.

In many cases, when a histogram (i.e., an empirical distribution) obtained from experimental data is compared to a range of model distributions to find 'the best fit', there will be several equally good (or equally bad) models matching the data. Obviously, such intrinsic ambiguity cannot facilitate reliable classification.

Although the number of postulated statistical models can be significant, there will still be an infinite number of other admissible distributions which may be more useful in characterizing a given set of experimental data. For example, if M1 and M2 are two primary model distributions, a new 'randomised mixture' model can be constructed by selecting M1 with probability $\eta$, and M2 with probability $(1-\eta)$. Obviously, the resulting model cannot be represented adequately by either one of the two underlying models.

In an attempt to characterize the shape of a model distribution, irrespective of its analytical form, various 'shape parameters' have been introduced. For example, it is known to utilize the mean-to-median ratio in order to measure the skewness of a distribution of fluctuating power. For the two Swerling models, when $\alpha=1$ and $\alpha=2$, the respective ratios equal 1.44 and 1.18. It should be pointed out that the mean-to-median ratio is independent of any scale parameter.

There are also widely used in mathematical statistics two parameters, $\gamma_1$ and $\gamma_2$, associated with the skewness and kurtosis (i.e., a measure of flatness) of a probability distribution. Practical estimates of the two parameters, $\gamma_1$ and $\gamma_2$, are based on higher-order sample moments of a distribution under consideration. If $\{x_1, x_2, \ldots x_N\}$ is a set of N observations, then the estimates of $\gamma_1$ and $\gamma_2$ can be determined from $$\gamma_1 = \frac{\frac{1}{N}\sum_{i=1}^{N}(x_i-\mu)^3}{\left[\frac{1}{N}\sum_{i=1}^{N}(x_i-\mu)^2\right]^{3/2}} \quad \gamma_2 = \frac{\frac{1}{N}\sum_{i=1}^{N}(x_i-\mu)^4}{\left[\frac{1}{N}\sum_{i=1}^{N}(x_i-\mu)^2\right]^2} - 3$$

where $$\mu = \frac{1}{N}\sum_{i=1}^{N} x_i$$

In the special case of a Gaussian distribution, $\gamma_1=0$ and also $\gamma_2=0$.

The parameters $\gamma_1$ and $\gamma_2$, or some others related to them functionally, appear frequently in the statistical literature. However, their applicability to the processing of experimental data on power reflected from complex man-made objects is limited for the three main reasons:

Samples of observed power are always non-negative, hence in general, the underlying distribution will be skewed to the right; however, such prior information is not incorporated in the skewness parameter $\gamma_1$.

When the number of samples of observed power is small or moderate (say, less than one thousand), the statistical errors associated with the estimates of $\gamma_1$ and $\gamma_2$ will be too large for reliable object classification.

In general, statistics based on sample moments are not 'robust', i.e., their resulting values can be significantly influenced by a relatively small number of observations with unusually large or small values (so-called 'outliers').

It would therefore be desirable to provide an improved method and an apparatus for determining informative shape descriptors of statistical distributions of randomly fluctuating power or intensity, especially for the purpose of entity classification based on the analysis of backscattered electromagnetic wave energy.

SUMMARY OF THE INVENTION

Aspects of the present invention are set out in the accompanying claims.

In accordance with a further aspect of the invention, a set of N samples $\{x\}=\{x_1, x_2, \ldots, x_N\}$ of a positive observable of interest, such as power or intensity of a signal reflected from an object, is obtained, and a logarithmic transformation is applied to each value $x_j$, $j=1, 2, \ldots, N$, of the primary set to produce corresponding values $z_j$, where $z_j=\ln x_j$. Consequently, the primary set $\{x\}$ is represented uniquely by the resulting secondary set $\{z\}=\{z_1, z_2, \ldots, z_N\}$. It should be pointed out that while the value of $x_j$ may only be positive, the value of $z_j$ can be positive as well as negative.

The values $z_j$, $j=1, 2, \ldots, N$, are rearranged into either ascending or descending order. If ascending order has been chosen, the sorting procedure will produce the secondary set ordered as follows $$z_{(1)} \leq z_{(2)} \leq \ldots \leq z_{(N)}$$

Next, the secondary set is used to determine the three descriptors of the primary set $\{x\}$ as follows:

1. The median M, defined by $M = z_{([N+1]/2)}$, if N is odd or $M = 0.5[z_{(N/2)} + z_{([N/2]+1)}]$, if N is even.

Although the numerical value of M represents the 'central' value of secondary set $\{z\}$, the 'central' value of primary set $\{x\}$ will just equal $\exp(M)$, because the logarithmic function is monotonic.

2. The median-minus-mean L, defined by $$L = M - \frac{1}{N}\sum_{j=1}^{N} z_j$$

3. The mean (absolute) deviation D about an average value. (Herein, the term "average" is intended broadly, to cover the median, the mean or the mode of a set of values.) Thus, D may represent the deviation about the median, i.e.

$$D = \frac{1}{N}\sum_{j=1}^{N} |z_j - M|$$

where M is the median.

Alternatively, the descriptor D may be the mean deviation about the mean, in which case $$D = \frac{1}{N}\sum_{j=1}^{N} |z_j - \mu| \quad \mu = \frac{1}{N}\sum_{j=1}^{N} z_j$$

It has been found that the above three descriptors, M, L and D, which can be obtained in a computationally simple manner, provide collectively a good discriminant for the many classes of positive random observables, especially fluctuating intensity of electromagnetic wave backscattered by complex objects.

While the median M is related to the 'central' value of the primary set $\{x\}$, and contains no information about the shape of the underlying statistical model, the two remaining descriptors, L and D, are scale-invariant and provide jointly informative shape characterization. Accordingly, the object may be represented (and classified) using the descriptors L and D, without M. However, the use of median M can be advantageous for determining a representative level of a signal reflected by an object of interest, and therefore may be used in circumstances where this is useful (for example to assist in distinguishing objects of similar shape but different sizes, or for providing auxiliary information, such as the range of the object).

Understanding the benefits provided by the 'D-L plane', or the 'D-L domain', constructed in accordance with the invention, can be facilitated by inspecting FIG. 3 which shows the relative locations of the many known statistical models of a positive observable, such as fluctuating power or intensity.

Each model is represented by a distinct curve, and each point on a selected curve corresponds to two specific values of the shape descriptors D and L. For example, the curve labelled "gamma" represents all possible pairs of values of D and L, which can be 'supported' by a gamma model. In particular, each of the two Swerling models is represented by a point with a unique pair of coordinates; one of these points (when $\alpha=1$) corresponds to an exponential distribution.

The properties of the D-L plane and those of the visualized statistical models of primary sets $\{x\}$ can be summarized as follows:

- The origin, D=0 and L=0, represents a distribution $p(x)$ 'degenerated' to a delta function, $\delta[x-\exp(M)]$, with no variability; each displayed distribution, except for a Suzuki and K-distribution, tends to this point as its variance approaches zero.
- The positive axis, D>0 and L=0, represents a log-normal distribution of x, which becomes a Gaussian distribution of z after a logarithmic transformation $z=\ln x$; a Gaussian distribution is known to be symmetric, with its mean and median coinciding at the same point, hence L=0.
- The line L=gD, where $g \approx 0.21$, represents a Weibull distribution. A Weibull random variable W can be obtained from an exponential random variable V by applying the transformation $W=V^\epsilon$, where $0<\epsilon \leq 1$ is a parameter. After the logarithmic transformation, $\epsilon$ becomes a scale parameter, and because $W \equiv V$ for $\epsilon=1$, the line L=gD must pass through the point representing an exponential distribution.
- Both of a Suzuki random variable and a K-distributed random variable are derived from an exponential random variable by randomly 'modulating' its scale. Therefore, each of those distributions will approach the exponential distribution as the variance of the random modulation tends to zero. It should be noted that neither of those two distributions can attain the values of descriptor D less than that of an exponential distribution.
- In statistical communications, the Rice distribution is used to characterize an observable generated by a model in which a contribution of one distinct constant component is combined with contributions of a plurality of random components of equal importance. For example, a Rice distribution is used as a model of power backscattered by an object comprising one dominant reflector and a plurality of smaller scatterers. In the D-L plane, the Rice distribution will approach the point representing an exponential distribution as the contribution of the distinct component is being gradually reduced and eventually becomes comparable to those of all other components. On the other hand, when the contribution of the distinct component becomes more and more dominant, the Rice distribution will approach the origin, D=0 and L=0. It should be noted that Rice distribution cannot attain the values of descriptor D greater than that of an exponential distribution.

A 'pivotal' role played in the D-L domain by the exponential distribution simply reflects its prominence in mathematical statistics.

BRIEF DESCRIPTION OF THE DRAWINGS

Arrangements embodying the invention will now be described by way of example with reference to the accompanying drawings, in which.

DETAILED DESCRIPTION OF THE PREFERRED EMBODIMENTS

Figure 1:
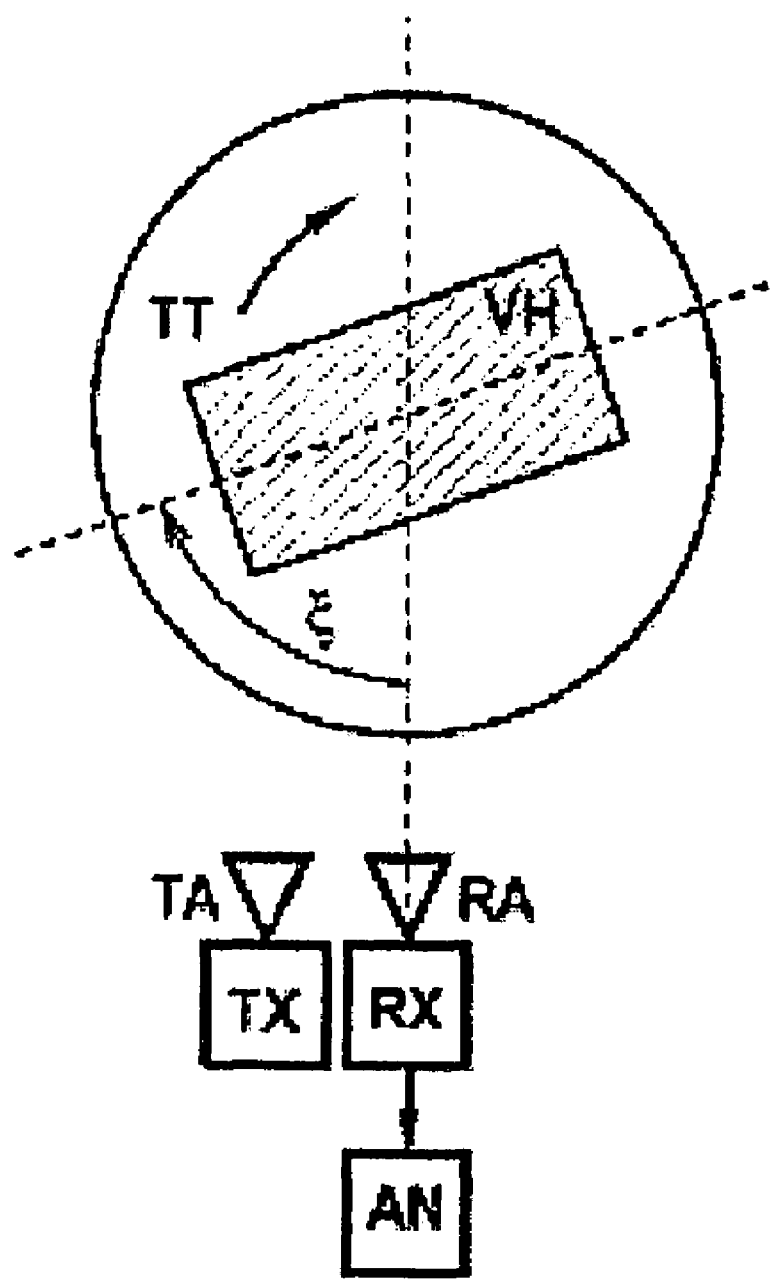
FIG. 1 illustrates schematically a hypothetical experiment in which a vehicle, rotated on a turntable, is illuminated by pulses of electromagnetic wave energy to determine the vehicle's backscattering characteristics.
Figure 2:
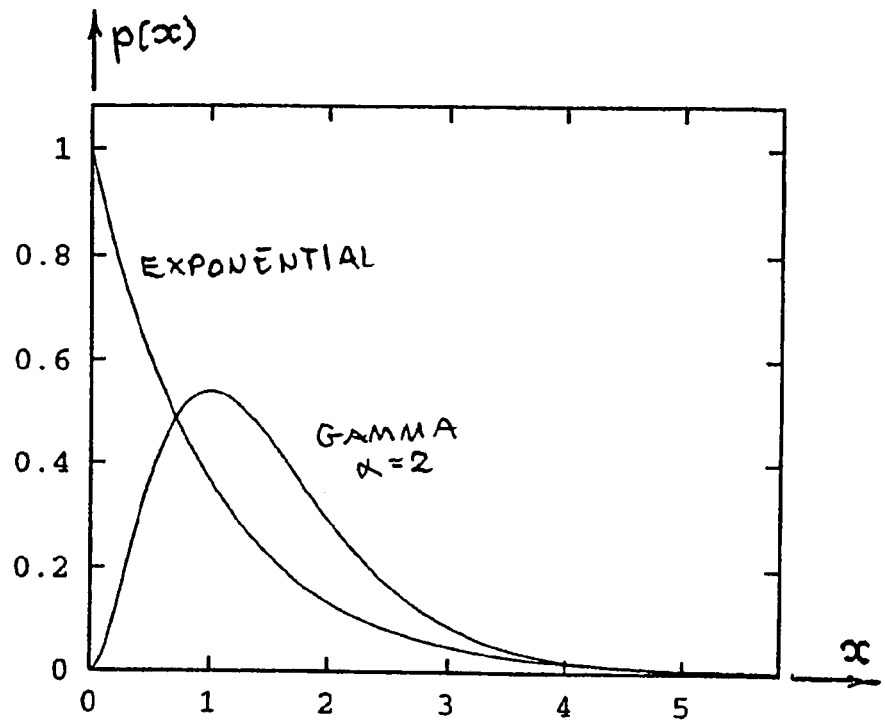
FIG. 2 shows the probability density functions representing the two Swerling models.
Figure 3:
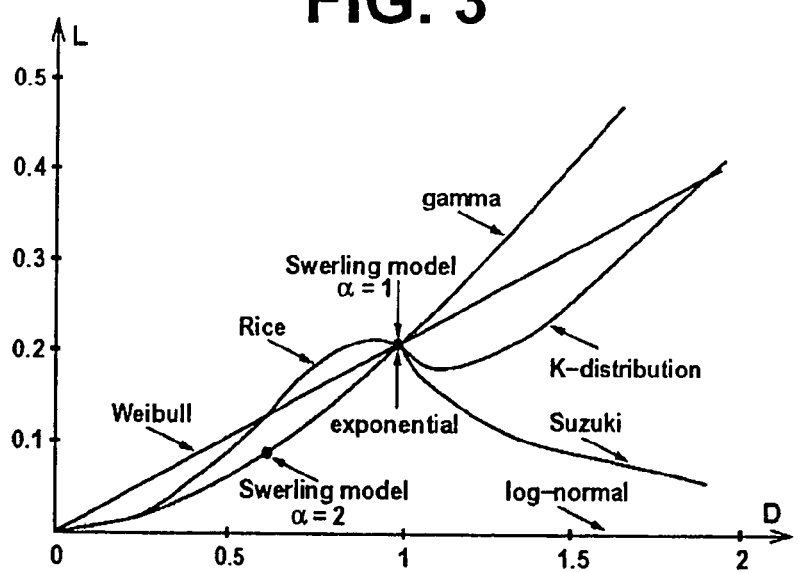
FIG. 3 depicts the 'D-L domain', constructed in accordance with the invention, to visualize the relative locations of the many known statistical models of a positive observable, such as fluctuating power or intensity.
Figure 4:
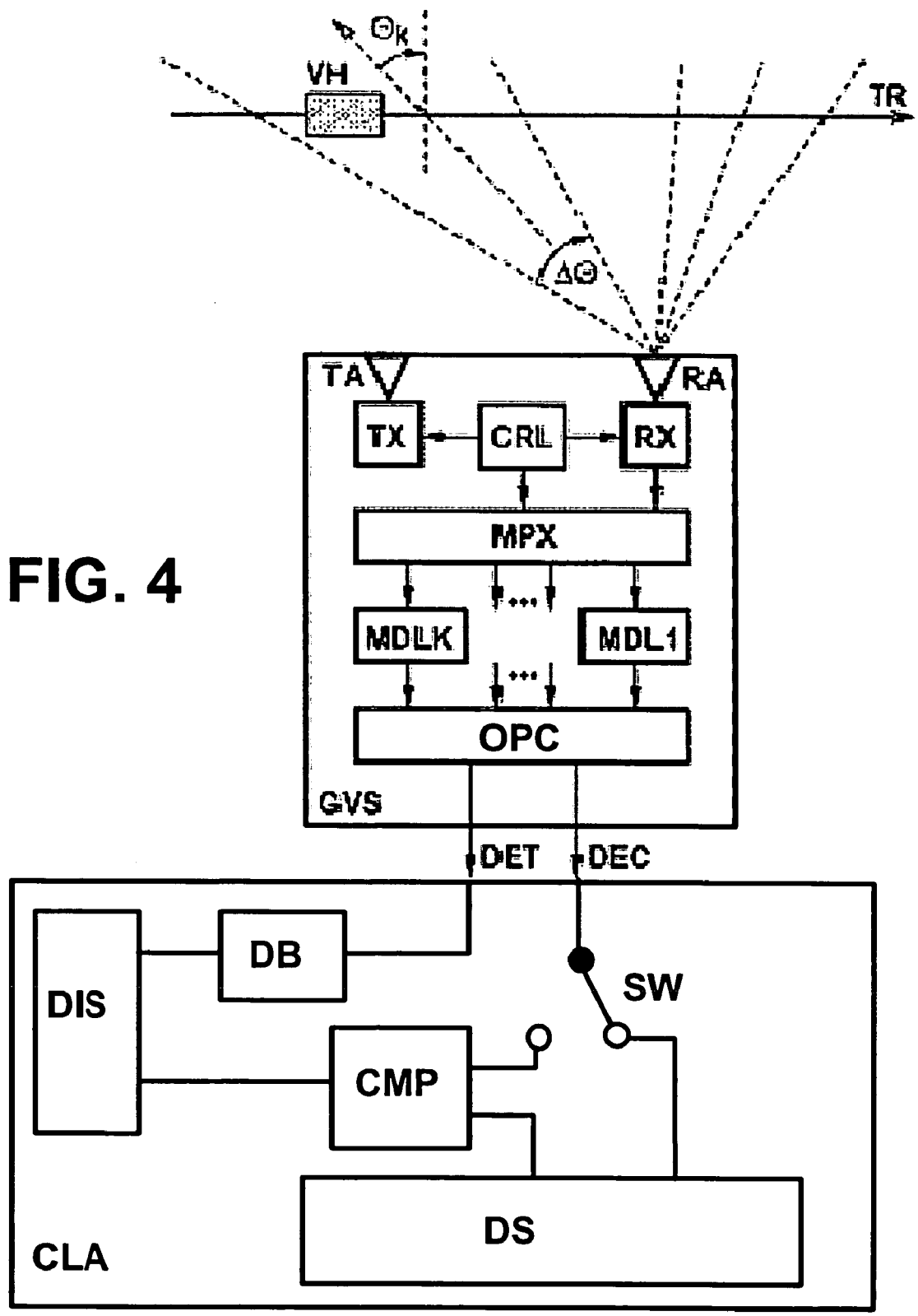
FIG. 4 shows a classification system in accordance with the invention.

FIG. 4 depicts a classification system according to the invention in an example of a possible surveillance scenario in which the present invention can be usefully employed. A ground vehicle VH, of unknown class, is moving along a predetermined trajectory TR, e.g., such as defined physically by a road. A microwave ground-vehicle sensor GVS utilizes pulses of electromagnetic wave energy to illuminate the surveillance region. Then, by analysing the power characteristics of signals backscattered by the region, the ground-vehicle sensor GVS detects a vehicle and makes a decision regarding the most likely class to which the detected vehicle belongs.

The sensor GVS outputs a detection signal DET used in determining the presence or absence of a vehicle, and a descriptor signal DEC comprising descriptors for use in vehicle classification.

These signals are received by a vehicle detector/classifier CLA. The detection signal DET is sent to a decision block DB to decide on the presence or absence of a vehicle, and the results of the decision are sent to a display DIS. A switch SW is shown set to a training mode position, in which the descriptor signal DEC is sent to a descriptor store DS. The switch SW can alternatively be set to a recognition mode position, in which the descriptor signal is sent to a comparator CMP, for comparison, in succession, with respective collections of descriptors, related to respective different object categories, stored in the descriptor store DS. The results of the comparison are displayed on the display DIS.

The illustrated system thus has the capability of being trained to recognise certain categories of vehicles. The various techniques typically used in the training of statistical models may be employed. For example, the data stored in the descriptor store DS may be derived from statistical analysis of multiple measurements of vehicles in each category. The stored data may represent templates for the respective categories, and the recognition procedure may involve matching newly-acquired data to these templates, for example by calculating the distance between a point in multi-dimensional space representing the descriptors of the object to be classified and points representing the object categories. Alternatively, neural network techniques can be used, in which case the descriptors derived during training will be used (in a manner known per se) to derive neuron weights.

In order to perform the required functions of vehicle detection and classification, the ground-vehicle sensor GVS comprises a microwave pulse transmitter TX driving a suitable transmit antenna TA, a receive antenna RA connected to a receiver RX, a control unit CRL, a multiplexer MPX, a plurality of descriptor processors, MDL1 . . . , MDLK, and an output circuit OPC.

The ground-vehicle sensor GVS utilizes K fields of view, FOV1, . . . , FOVk, . . . , FOVK, each characterized by a nominal 'look' angle $\theta_k$, and an angular extent $\Delta\Theta$, as depicted in FIG. 4. The sensor device is arranged to operate in such a manner that pulses of energy transmitted by the transmitter TX and transmit antenna TA and reflected by a moving vehicle within each field of view FOV are captured by the receive antenna and receiver RX.

In the scenario depicted in FIG. 4, as a vehicle is moving along a predetermined path, the aspect angle is changing continually, and the power of pulses reflected by the vehicle fluctuates in an irregular manner. If the intervals between the interrogating pulses are too short to obtain decorrelation of the reflected pulses, it may be advantageous to employ additionally frequency agility, as discussed above. Additionally, or alternatively, the polarisation of the interrogating signal may be varied.

The ground-vehicle sensor GVS of FIG. 4 captures pulses reflected by a vehicle during K observation intervals determined by the sensor's fields of view, FOV1, . . . , FOVK, and the vehicle's speed. The actual number of captured pulses will also depend on the repetition frequency of transmitted pulses illuminating the surveillance region. The receiver RX constructs K sets of values, each set containing values $\{x_1, x_2, \ldots, x_N\}$ of power of each pulse reflected by a vehicle moving within a selected field of view FOV.

Each set of pulses reflected from the surveillance region within each field of view FOV is then delivered by the multiplexer MPX to a respective one of the descriptor processors, MDL1, . . . , MDLK for processing to determine the values of the three descriptors, M, D and L. Next, the median values, M1, M2, . . . , MK are collected by the output circuit OPC to generate the detection signal DET enabling the classifier CLA to make a decision regarding the presence or absence of a vehicle in the surveillance region. Then, all the values of the three descriptors, M1, D1, L1, M2, D2, L2, . . . , MK, DK and LK, are collected by the output circuit OPC and provided in a suitable format as the descriptor signal DEC, used by the classifier to make a decision regarding the most likely class to which the detected vehicle belongs.

Figure 5:
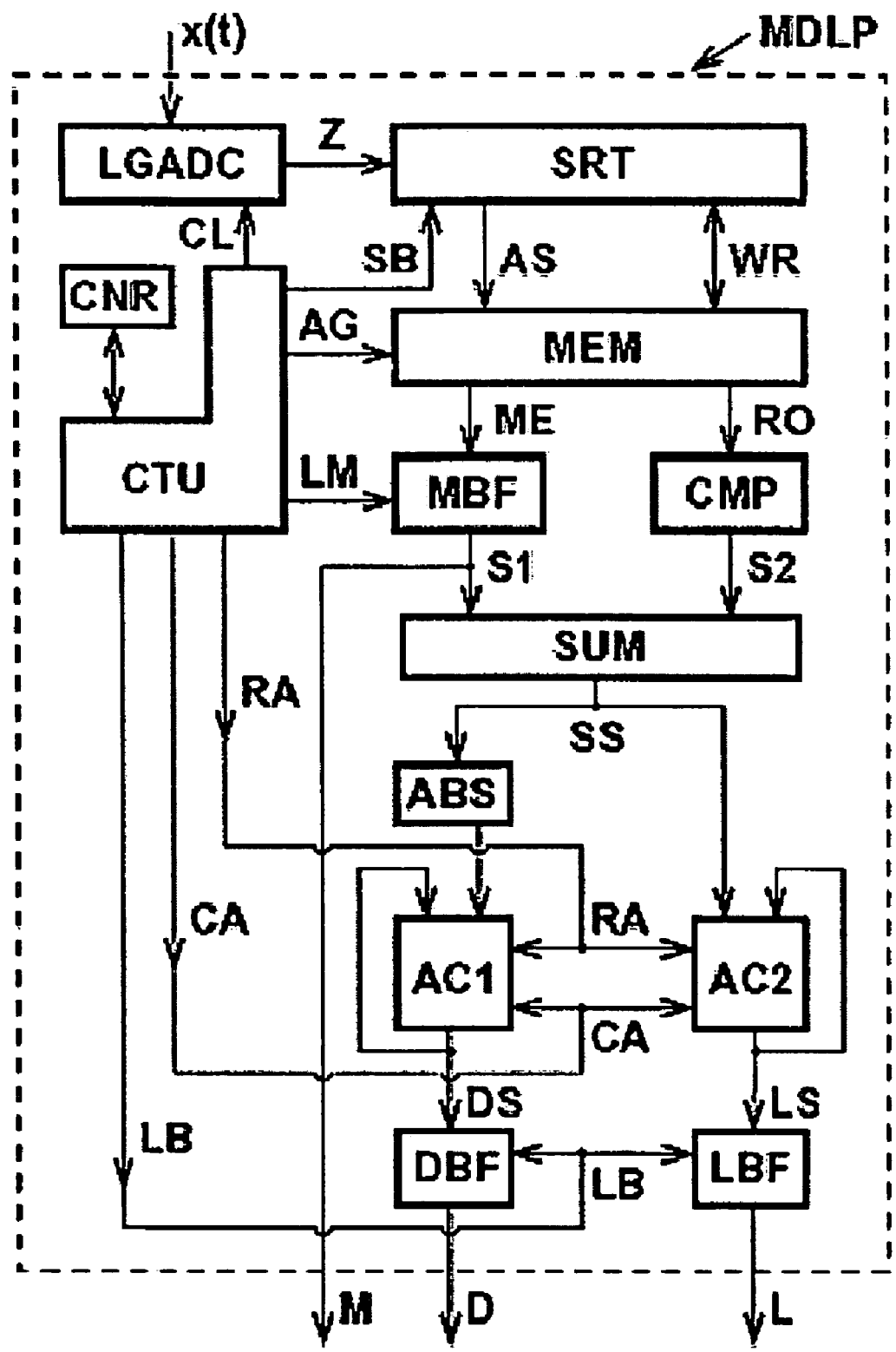
FIG. 5 is a block diagram of a digital processor used in the system of FIG. 5.

FIG. 5 is a block diagram of a digital descriptor processor (MDLP) arranged to operate in accordance with the invention. Each of the descriptor processors MDL1, . . . , MDLK may have a structure corresponding to this processor MDLP, or a single processor MDLP may be used successively to perform the functions of the multiple processors MDL1, . . . , MDLK.

The processor MDLP comprises a logarithmic analog-to-digital converter LGADC, a sorter SRT, a control and timing unit CTU, a sample counter CNR, a memory MEM, three buffers, MBF, DBF and LBF, a complement-value circuit CMP, an adder SUM, an absolute-value circuit ABS, and two accumulators, AC1 and AC2.

Values of a positive input signal x(t) representing an observable of interest, such as power or intensity, are converted into a digital form by the converter LGADC at the time instants determined by clock pulses CL supplied by the unit CTU. As a result, the output Z of the converter LGADC produces a sequence of digital words, each representing a logarithm $z_j$ of a sample of x(t) taken at $t_j$, hence $z_j = \ln x(t_j)$.

In order to determine a preselected number N of input samples to be processed by the processor MDLP (which operates in a batch-processing mode), the unit CTU utilizes a suitable sample counter CNR. The operation of the processor MDLP comprises two cycles: a SORT cycle followed by a COMPUTE cycle. Each of the two cycles is initiated and terminated by the unit CTU which produces all timing and control signals required for a correct operation of the processor MDLP.

The unit CTU initiates the SORT cycle by sending an 'enable command' via an input SB to the sorter SRT which receives digital words $z_j$ from the converter LGADC. The sorter SRT rearranges received digital words into either ascending or descending order. For this purpose, the sorter SRT employs the memory MEM with two busses: an address bus AS and a write/read bus WR. The sorter SRT may implement one of the many sorting algorithms, well known to those skilled in the art.

As soon as the preselected number N of input samples has been registered by the counter CNR, the unit CTU terminates the SORT cycle by disabling the sorter SRT via input SB. Now, the unit CTU initiates the COMPUTE cycle by resetting the accumulators, AC1 and AC2, via a common input RA. The unit CTU also loads a median value from the memory MEM to the buffer MBF by generating a suitable signal at its output LM driving a 'load' input of the buffer MBF. The 'data' input ME of the buffer MBF is connected to a predetermined memory cell which contains the median value of the set of N input samples. In order to avoid additional calculations, preferably the number N of samples being processed will be an odd number.

During the COMPUTE cycle, the unit CTU employs the sample counter CNR to generate a sequence of suitable addresses at output AG connected to the address bus of the memory MEM. As a result, all values $z_j$, stored in the memory MEM, appear sequentially at the read output RO connected to a complement-value circuit CMP. The purpose of the circuit CMP is to reverse the sign of a digital word supplied by the memory MEM.

The adder SUM receives two input values: the median M, at input S1, and a reversed-polarity sample $-z_j$, at input S2. Hence, the adder SUM produces at its output SS a value representing the sum, $(M-z_j)$; an absolute-value circuit ABS is used to obtain the corresponding magnitude $|M-z_j|$. Therefore, the accumulators, AC1 and AC2, determine, respectively, values of the following global sums $$AC1: DS = \sum_{j=1}^{N} |M - z_j| \quad AC2: LS = \sum_{j=1}^{N} (M - z_j)$$

The timing of the accumulators' operation is governed by suitable clock pulses supplied by the unit CTU via a common clock input CA.

When all the samples stored in the memory MEM have been used up, the contents of the accumulators, AC1 and AC2, are transferred to the respective buffers, DBF and LBF, at the time instant determined by a suitable signal supplied by the unit CTU to drive a common 'load' input LB of the buffers. Hence, when the COMPUTE cycle terminates, the outputs M, D and L of the MDL processor provide the values representing the descriptors, M, D and L, characterizing the set of input samples which have been processed. If required, the value of the descriptors D and L can be normalized, for example, by simply using a suitably selected number of the most significant bits in their respective binary representations.

In the above configuration, it is assumed that only one set of samples is obtained from an input signal x(t) to be used for further processing. Accordingly, during COMPUTE cycle, the sorter SRT remains idle. However, a continuous operation can be achieved by utilizing two memories: one employed for sorting purposes only, and another one storing already sorted values to be used in COMPUTE cycle. If such modified configuration is utilized, the two cycles, SORT and COMPUTE, can run concurrently: while an already sorted set of samples is being used for computation, a new sequence of input samples is being suitably rearranged by the sorter.

The embodiment described above operates by deriving a single set of descriptors for each observation angle, or field of view FOV. The multiple descriptor sets are used for classification purposes. However, alternative techniques are possible. For example, the system could be arranged to derive a single set of descriptors from the samples obtained throughout all the fields of view, and use this single set for classification purposes. In this case, the single set of descriptors will be influenced to a greater extent by the overall configuration of the object, rather than merely the shape as seen from a single point of view.

Depending on the circumstances, it may also be possible to use a single set of descriptors derived from a single observation angle for classification purposes.

In the described embodiment, the processed signals are reflections of an interrogating signal. However, this is not necessarily the case. For example, the processed signals could be sound waves, e.g. an acoustic signal generated by an object of interest, or reflections of waves from a separate source (e.g. ambient light).

The invention is applicable in many areas, in addition to the classification of objects. The invention could be use for monitoring communication signals to detect propagation errors caused by interference or shadowing, or to detect sea or land clutter, or meteorological conditions, or for classification using signals representing colours or textures. A particularly useful class of application operates using the null hypothesis; that is, the system is arranged to store data representing a classification of a normal situation (e.g. signals representing sea clutter), and to determine when the received signals represent a departure from that situation (e.g. due to the presence of an object such as a ship or a person) and, in response thereto, generate a detection signal. Thus, the classification process is reduced to a simple binary yes/no decision.

The embodiment described with reference to FIGS. 4 and 5 can be entirely embodied in hardware, in which case the skilled man would readily be able to design and construct suitable detailed circuitry to perform the required functions of the various blocks. Alternatively, some of these functions could be performed in software using a suitably programmed general-purpose or specially-designed computer which receives sample values and derives descriptors therefrom; accordingly, the present invention extends to such a programmed computer and to a computer program arranged to cause a computer to operate in such a manner and to a program carrier carrying such a program. Generally, the invention extends to a signal processing apparatus, irrespective of how it is constructed.

When implementing the logarithmic transformation, various techniques, known in themselves, may be carried out. It is not essential that the results be completely accurate, so long as they at least approximate a logarithmic transformation.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method of representing an entity, comprising:
repeatedly sampling a signal from the entity to obtain a first set of values each dependent on the intensity of the received signal;
applying a logarithmic transformation to the sample values to obtain a second set of values; and
deriving a set of descriptor values, the set comprising at least a first descriptor value (L) representing the difference between the mean and the median of the second set of values, and a second descriptor value (D) representing the mean of the absolute value of the deviation between each second set value and the average of the second set of values.

2. A method as claimed in claim 1, wherein the set of descriptor values further includes the median value (M) of the second set.

3. A method as claimed in claim 1 or claim 2, including performing the repeated sampling operation when the entity has a plurality of different aspect angles with respect to an observation location.

4. A method as claimed in claim 3, including the step of deriving multiple descriptor value sets, each associated with a different with a different aspect angle.

5. A method as claimed in claim 3, including the step of deriving a descriptor value set in which each descriptor is derived from samples obtained at a plurality of different aspect angles.

6. A method as claimed in claim 1 wherein the average of the second set of values is the mean of the second set.

7. A method as claimed in claim 1, wherein the average of the second set of values is the median of the second set.

8. A method as claimed in claim 1, including the step of generating and transmitting an interrogating signal, the signal from the object being a reflection of the interrogating signal.

9. A method as claimed in claim 8, wherein the interrogating signal is an electromagnetic signal.

10. A method as claimed in claim 9, wherein the interrogating signal has a varying polarization.

11. A method as claimed in claim 8, wherein the interrogating signal is an acoustic signal.

12. A method as claimed in any one of claims 8 to 11, wherein the interrogating signal has a varying frequency.

13. A method of classifying an entity, the method comprising representing the entity using a method as claimed in claim 1, and using the derived descriptors to classify the entity.

14. A method as claimed in claim 13, wherein the entity is classified by comparing the descriptors with the contents of a store containing multiple collections of data, each collection having been derived from the descriptors produced by a training operation using a respective category of entity.

15. A method as claimed in claim 13, including the step of detecting when the descriptors no longer match a classification representing a normal situation, and generating a detection signal in response thereto.

16. A method of establishing a store of entity representations, comprising:
(i) using a method as claimed in claim 1 to derive descriptors representing an entity in a first category;
(ii) storing a collection of data derived from the descriptors; and
(iii) repeating steps (i) and (ii) for entities in other categories.

17. Apparatus for generating a representation of an entity, the apparatus being arranged to operate using a method as claimed in claim 1.

18. Apparatus for classifying an entity, the apparatus being arranged to operate using a method as claimed in any one of claims 13 to 15.

19. A computer program arranged to derive a set of descriptors representing an entity from a first set of values obtained by sampling a signal received from the entity, the program being arranged to convert the first set of values into a second set of values by applying a logarithmic conversion to the values of the first set, to derive a first descriptor value (L) representing the difference between the mean and the median of the second set of values, and to derive a second descriptor value (D) representing the mean of the absolute value of the deviation between each value of the second set and an average of the second set of values.

20. Signal processing apparatus responsive to a first set of values obtained by sampling a signal received from an entity and arranged to derive a set of descriptors representing the entity, the apparatus being arranged to convert the first set of values into a second set of values by applying a logarithmic conversion to the values of the first set, to derive a first descriptor value (L) representing the difference between the mean and the median of the second set of values, and to derive a second descriptor value (D) representing the mean of the absolute value of the deviation between each value of the second set and an average of the second set of values.

* * * * *